UNITED STATES PATENT OFFICE.

EDWIN T. MARLER, OF WOOD VALE, DULWICH, ENGLAND.

IMPROVEMENT IN COMPOSITIONS FOR PRINTERS' INKING-ROLLERS.

Specification forming part of Letters Patent No. 218,041, dated July 29, 1879; application filed April 22, 1879; patented in England, March 21, 1879.

*To all whom it may concern:*

Be it known that I, EDWIN THOMAS MARLER, of Wood Vale, Dulwich, England, have invented an Improved Composition for Printers' Inking-Rollers, of which the following is a specification.

This invention relates to an improved composition for printers' inking-rollers, the object of which is to produce an efficient roller that will be free from the imperfections heretofore existing in the same.

Printers' inking-rollers of which glycerine is a component part possess great advantages in comparison with those in which there is no glycerine; but by reason of the property in glycerine whereby it attracts surrounding moisture such rollers are liable to become tender on the face and to fret at the ends, or to become so strongly marked by the type and rules that they distribute the ink very unevenly, and are rendered practically useless. These results cause delay and consequent loss and other annoyances.

The main object of my said invention is to provide means for obviating these defects and difficulties without sacrificing the advantages resulting from the use of glycerine.

I carry my said invention into practice as follows—that is to say, I take of glue thirty-two (32) parts; glycerine, fifty-six (56) parts; sugar or other saccharine matter, twelve (12) parts, and of pure india-rubber or caoutchouc dissolved in naphtha, oil of turpentine, or any other suitable chemical solvent, ten (10) parts. Having first soaked the glue for a period ranging from forty (40) minutes to two (2) hours, according to the state of the temperature, (more time being required when the temperature is low than when it is high,) I draw off the water and allow the glue to remain in that condition for at least twelve (12) hours. I take the glycerine, and, placing it in a steam-jacketed kettle or other convenient vessel, raise it to boiling-point, and then proceed to add one-half of the glue, then the sugar or other saccharine matter, then the remainder of the glue, stirring without intermission and keeping up the heat fully to the boiling-point, and when these ingredients are all thoroughly mixed I add the hereinbefore-named pure india-rubber solution while stirring vigorously. When all of the ingredients are well mixed I draw off the composition either into molds prepared for printers' rollers or into conveniently-sized slabs for storing for future use.

The proportions of the above-named ingredients may be slightly varied, and also the order of admixture, without departing from the principle of my invention. I prefer, however, that they should be substantially as above described.

What I claim is—

A composition for printers' rollers, composed of the following ingredients in the approximate proportions named, viz: glue, thirty-two parts; glycerine, fifty-six parts; sugar or other saccharine matter, twelve parts; pure india-rubber or caoutchouc dissolved in naphtha, oil of turpentine, or other suitable solvent, ten parts.

E. T. MARLER.

Witnesses:
HENRY H. LAKE,
J. T. KNOWLES.